April 14, 1942.                J. A. JACKSON                2,279,682
                              SHEARING SHAVER
                           Filed March 31, 1938           2 Sheets-Sheet 1

INVENTOR
Jesse Atwater Jackson

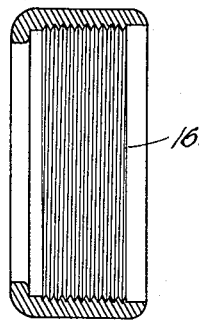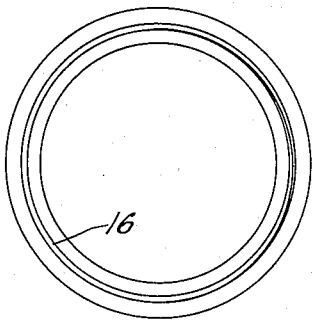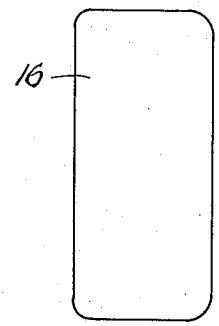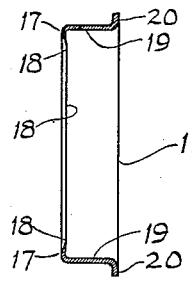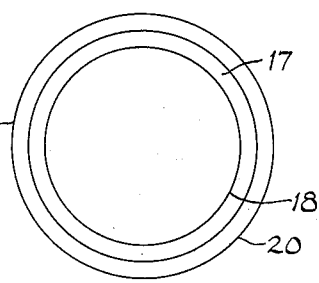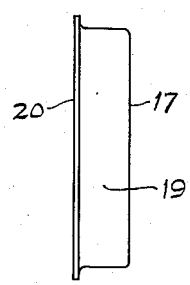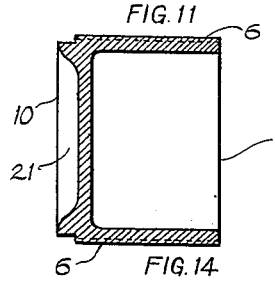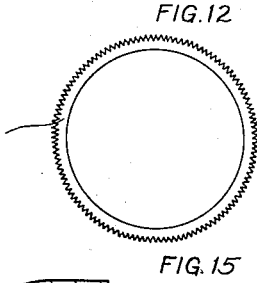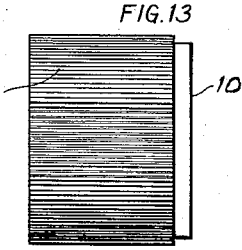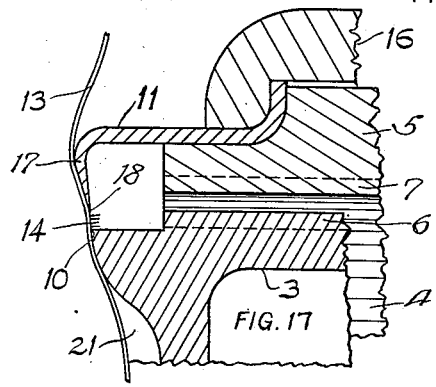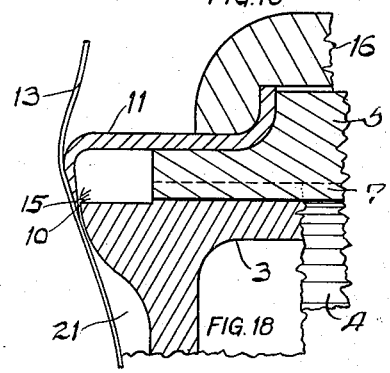

Patented Apr. 14, 1942

2,279,682

UNITED STATES PATENT OFFICE 2,279,682

SHEARING SHAVER

Jesse Atwater Jackson, Hilton Village, Va.

Application March 31, 1938, Serial No. 199,157

23 Claims. (Cl. 30—43)

The object of this invention is to provide a machine which will shave the face, or any surface which supports hair, bristles, threads, or stalks, by means of a shearing action between circular inner and outer blades acting together in a novel manner, and so disposed that they may be brought into close contact with the surface to be shaved. Because of its unique design this device is particularly adapted for shaving the face closely and smoothly without cutting or scraping, and lends itself easily to cheapness of manufacture and convenience in use. Its nature is such that its mechanism or motor may be mounted either in a small spherical housing which may be held cupped in the palm of the hand with the fingers and thumb easily disposed to guide the cutting head, or enclosed in a slender cylinder which may be held as one holds a pencil or brush. Its housing may be constructed cheaply by die-casting of metal, molding of phenol-plastic, or other means. Its outer blade and spring parts may be stamped out on a punch-press before tempering, and its spindle may be turned out cheaply on an automatic lathe. The small electric motor of very low power should be very simple and cheap to manufacture.

It is recognized that previous attempts have been made to shave by means of mechanical or electrically driven cutting blades, however in the present state of the art, such devices have guards with slots between which the hairs must protrude, the depth of the slot marking a limit to the closeness of the shave which may be produced, or in the absence of such guards, the moving blades are so disposed as to slice, cut or pinch the skin in the process. These effects are avoided in this invention by means of the following features: The outer faces of the blades have a reasonably flat surface so that when held or pressed to the face and drawn across it, no wrinkling, creasing or pinching of the skin is permitted, while at the same time the sharp inner edge of the outer blade is held close to the stubble, permitting a close shearing action; the outer blade is stationary with relation to the body of the device thus preventing any slicing or pinching action from its movement; the inner blade does not rotate primarily with relation to the outer blade, but engages the cutting edges by an hypocyclic rolling action, thus preventing any slicing action from its movement; the cutting edges of the inner and outer blades therefore engage by means of a shearing rather than clipping action, thus cutting the stubble or growth positively without danger of rolling or pulling the individual stalks as they are cut; the frequency with which the opening between the cutting edges is presented as the effective part of the cutting head is drawn across the face ensures the maximum amount of stalks being cut at the single pass; the shearing action of the blades operates to make them substantially self sharpening thus eliminating any pulling and inefficient action due to wear.

The form of this invention which is shown on the accompanying drawings is that particularly adapted for shaving the face, since other forms and sizes such as may be used for clipping animals, rugs, fabrics, etc., will readily suggest themselves from this description. An electric driving motor is shown, but it will be readily seen that a manually wound spring device may easily be substituted in its place for rotating the spindle. Another possible form of this invention could be designed by using a mere inversion of the mechanism herein described, whereby the inner blade would be held stationary and the outer blade moved hypocyclically about it, however, this form is not described in detail as it does not lend itself as readily to simplicity and rigidity of design.

Figure 8 is a central cross-sectional view of the nut.

Figure 9 is an end view of the nut.

Figure 10 is a side view of the nut.

Figure 11 is a central cross-sectional view of the stationary cutting blade.

Figure 12 is an end view of the stationary cutting blade.

Figure 13 is a side view of the stationary cutting blade.

Figure 14 is a central cross-sectional view of the movable blade cylinder.

Figure 15 is an end view of the movable blade cylinder.

Figure 16 is a side view of the movable blade cylinder.

Figure 17 is a portion of a central cross-sectional view of the complete assembly.

Figure 18 is a portion of a central cross-sectional view of the complete assembly.

Figure 1:
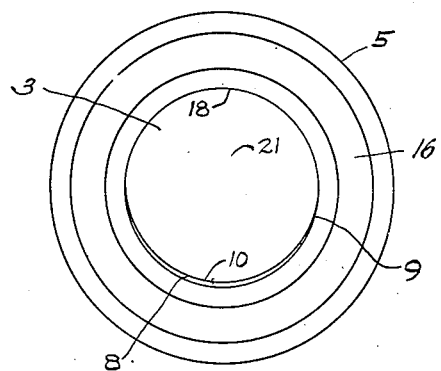
Figure 1 is an end view of the device.
Figure 2:
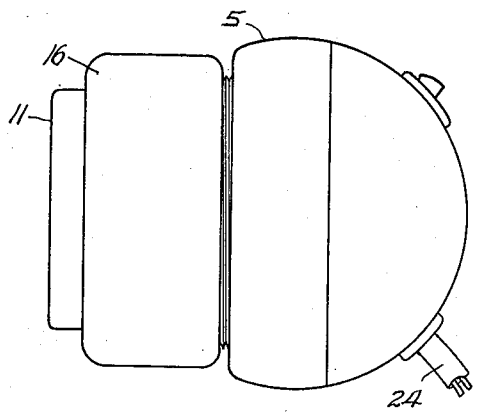
Figure 2 is a side view.
Figure 3:
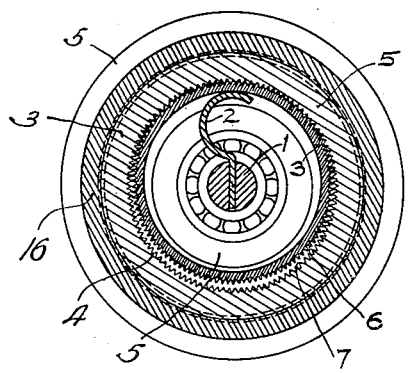
Figure 3 is a cross-sectional view of the cutting head.
Figure 4:
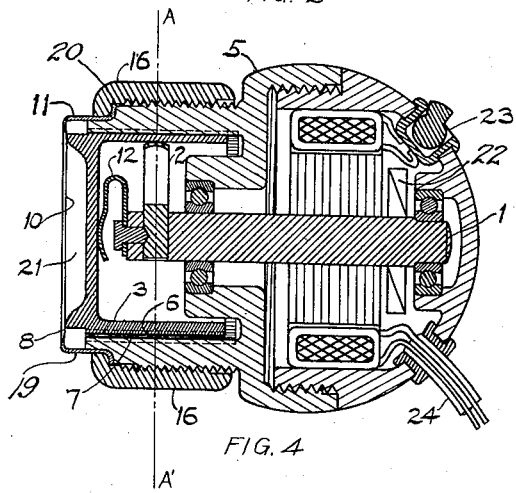
Figure 4 is a central cross-sectional view of the complete assembly.
Figure 5:
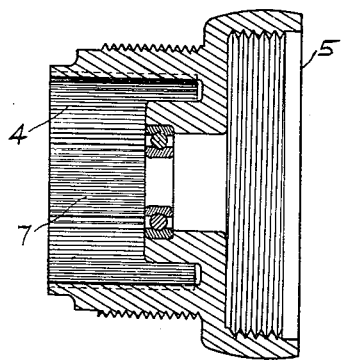
Figure 5 is a central cross-sectional view of the cutting head housing part.

The shearing action between the blades is brought about by the rotation of the spindle 1, which moves the point of contact of the spring 2 about the inside surface of the inner blade cylinder 3 which is shown in detail in sectional, end and side views respectively in Figures 14, 15 and 16. This movement and the pressure of the spring 2 cause the inner blade cylinder 3 to move in an hypocyclic manner within its clearance inside the space 4 of the cutting head housing part 5 shown in cross-sectional detail in Figure 5. The cylinder 3 is prevented from sliding and is kept in straight alignment within the space 4 by means of the engagement between the external teeth 6 and the internal teeth 7 of the two surfaces, but it should be noted here that the same effect could be accomplished without the use of teeth by having the two surfaces be a combination having anti-sliding properties, such as knurled metal against Bakelite, smooth metal against a thin coating of rubber on the other surface, metal against a coating of felt or fiber, etc. The hypocyclic motion of the inner cylinder 3 causes the crescent shaped opening 8 of Figure 1 to revolve about the central axis in such a manner that there is constant shearing action at the point where the cutting edges come together again. The term crescent is used here and in the claims in its narrower or more accurate meaning, i. e., shaped like the moon in its first or last quarter, a figure formed by two arcs, the radius of the inner arc being greater than the radius of the outer arc. Assuming clockwise rotation of the spindle in Figures 1 and 3, the point 9 where the cutting action occurs would be traveling around the circle with a frequency equal to the number of revolutions of the spindle. The edge of the inner cutting blade 10 which is located on the end of the inner cylinder 3 is held against the outer blade 11 by the spring 12, and is prevented from tilting or otherwise fouling the edge of the outer cutting blade, because its diameter is slightly larger than that of the outer blade's edge and because it is always held to one side and in straight alignment by the spring 2. It should be noted that the geometrical center of the circle formed by the edge of the inner cutting blade is always slightly away from the geometrical center of the circle formed by the edge of the outer cutting blade, and that the one center travels in a very small circle around the other center; also that the difference between the radii of the inside of the walls enclosing the cylindrical space 4, Figure 5 and the outer walls of the movable blade cylinder Figure 14 should be greater than the maximum width of the crescent shaped opening between the cutting edges.

Figures 8, 9 and 10 show respectively, sectional, end and side views of the nut 16 which clamps the outer blade 11 firmly to the housing part 5. Figures 11, 12 and 13 show respectively, sectional, end and side views of the outer blade 11 which has an outer face 17 of circular outline dished slightly inwards to form its cutting edge 18. Its body 19 and rim 20 are designed to give it stiffness of shape and provide means for clamping in place.

Figure 6:
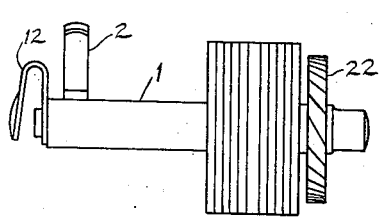
Figure 6 is a side view of the rotor, complete.
Figure 7:
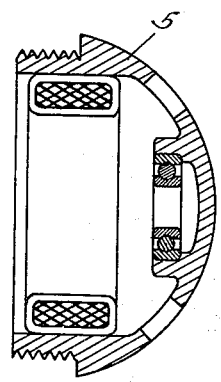
Figure 7 is a central cross-sectional view of the stator housing.

Figures 14, 15 and 16 show respectively, sectional, end and side views of the inner cutting blade cylinder 3 with its cutting edge 10 and toothed surface 6. If it is desired for cheapness of manufacture to make the cylindrical portion of this part of a different material than the cutting edge itself, this may be done by having the cutting blade be a metal disc insert in a phenol plastic molding or metal die-casting. If desirable from the standpoint of replacement due to wear, the blade portion of this part may be made separately and fastened to the cylindrical portion by a screw or other means. The depression 21 in the outer face of the cutting blade is not an essential feature of the device and may be made shallower than shown or eliminated entirely. Other optional features are: the fan 22 of Figure 6; slots or openings in the main housing for ventilating the motor (not shown); the particular location of the electric cord 24 and the switch 23; the particular form of the bearings to be used for the spindle, which are shown as ball bearings with the thrust taken on the rear bearing.

The manner in which the shearing action occurs is shown in the enlarged sectional views of Figures 17 and 18. When the cutting head is held against the surface of the face 13 and drawn downward across that surface the motion of the inner cutting blade 3 brings the crescent shaped opening 8 of Figure 1 successively into alignment as at 14 in Figure 17 and allows the hairs to protrude freely into that opening. Then as the point 9 of Figure 1 travels around and the opening as shown in Figure 17 is closed, the edge 10 of the inner cutting blade 3 moves across the edge of the outer cutting blade 11 and by so doing shears the hairs off as shown at 15 in Figure 18. This action occurs repeatedly with a frequency equal to the rotation of the spindle, which is made sufficiently high that even if the cutting head is drawn across the skin with a quick motion of the hand, all the surface will be thoroughly shaved. In using this device on a yielding surface such as the face, the cutting head may be tilted slightly back from the direction in which the drawing across motion is produced, and the skin may be held reasonably smooth if necessary by those contortions of the facial muscles or manipulations with the other hand already well known to shavers. The motion of drawing across need not be limited to the downward direction indicated in Figures 17 and 18, but may be produced in any direction to suit the various contours as suits the shaver.

I claim as my invention:

1. In a shearing shaver, a body having a circular outside cutting edge, a member having a circular inside cutting edge lying in the plane of the first-mentioned edge, and means for relatively moving the body and the member to urge the two cutting edges into constant contact and for rotating one of the two cutting edges in a path wherein any given point on one of the edges moves in a multicusped hypocycloidal and generally circular path, said point repeatedly crossing and re-crossing the margin of the other edge as said point moves relatively slowly along such other edge.

2. The device of claim 1 in which both of the curved edges are circular and form between them a crescent shaped opening which revolves about the axis of one of the cutting edges.

3. The device of claim 1 in which the hypocycloidal path has more than ten cusps per quadrant.

4. A dry shaver including a fixed blade having a circular shearing edge, a rotary blade having a circular shearing edge of greater diameter than said first-mentioned edge, and means for holding the movable blade against the fixed blade and for rotating said movable blade in a path wherein any given point on the movable shearing edge repeatedly crosses the stationary shearing edge during each revolution of the movable blade, thereby effecting a progressive shearing action.

5. An electric dry shaver comprising a housing having a cylindrical bore, an in-turned cutting blade carried by said housing coaxially with said bore and having a circular shearing edge, a cylinder having a loose rolling fit within said bore and having a circular shearing edge the diameter of which exceeds the diameter of the first-mentioned shearing edge, and resilient motor-driven rotary means for holding the cylinder against a progressively moving line of contact with the surface of said bore and with its shearing edge against the shearing edge of the cutting blade, said cylinder being of less diameter than said bore whereby a crescent opening is formed between the two edges and any given point on the movable shearing edge repeatedly moves across the stationary cutting edge during each revolution of the cylinder within the bore of the housing, thus effecting a progressive shearing action.

6. In an electric dry shaver, a stationary cylindrical member provided with a replaceable cutting blade having a circular cutting edge, a cylindrical body within said member and having a circular cutting edge movable in the plane of the first-mentioned cutting edge and offset to form a crescent-shaped opening and means to move said body to effect a progressive shearing action of the two edges and a rotation of said crescent-shaped opening.

7. In an electric dry shaver, a hollow member having a circular shearing edge, an inner member revolving about an axis constantly parallel to the axis of said edge and having a circular shearing edge in the plane of and cooperating with said first mentioned edge forming therewith a crescent-shaped opening and means for rotating said member to effect a progressive shearing action of the two circular edges.

8. In a shearing shaver, a motor-driven spindle, a housing encasing said spindle and having a cylindrical bore, a cutting blade removably carried by the housing and having a circular shearing edge coaxial with the bore, a hollow member loosely received within the bore and having a circular shearing edge of greater diameter than the edge of the blade, resilient means for holding the edges in constant contact, and means movable with the spindle for holding the hollow member against the surface of the bore so that the axis of the hollow member is constantly parallel to the axis of the bore and revolves about the latter as the spindle is revolved by its motor.

9. In a shearing shaver, two members loosely nesting and having cooperating cutting edges, motor driven means for producing a rapidly revolving line contact between the two members and also relatively slow revolution of the inner nested member.

10. The device of claim 9 in which the cutting edges are circular, and are constantly in a substantially single plane.

11. The device of claim 9 in which the cutting edges are circular and the cutting edge of the inner nested member is of greater diameter than the cutting edge of the outer member.

12. The device of claim 9 in which the cutting edges are circular, the diameter of the cutting edge of the inner member is greater than the diameter of the cutting edge of the outer member and spring means are provided to hold the circular edges in constant contact with one another.

13. The device of claim 9 in which the two members have a toothed engagement, the teeth on each member being parallel to the axis of the motor driven means and perpendicular to the plane of the cutting edges.

14. A shearing shaver including two members having cooperating smoothly circular shearing portions lying on opposite sides of a plane perpendicular to the axis of the shearing portions and containing the cutting edges of the shearing portions, said shearing portions being relatively movable with their cutting edges constantly in said plane.

15. A dry shaver housing for a shaver of the type employing two cooperating cutting members each with a circular cutting edge, said housing comprising a spherical portion receivable in the palm of the user, and a cylindrical portion, smaller in diameter than the spherical portion, extending from the spherical portion coaxially with one of said cutting edges so as to be conveniently held by the thumb and fingers of the user, the axial length of the cylinder being less than the diameter of the spherical portion.

16. A dry shaver comprising a housing having a spherical portion, a cylindrical portion and a stationary circular cutting element detachably held by said portions with its circular cutting edge coaxial with the spherical and cylindrical portions, rotating means wholly within the housing cooperating with said cutting element, the over-all axial length of the shaver being only slightly greater than the diameter of the spherical portion whereby the shaver may be substantially confined within the hand of the operator.

17. A dry shaver housing comprising a casing to house a rotatable cutter having a circular cutting edge the axis of which is normal to the user's face at the point of shaving, said housing being symmetrical with respect to its axis and for somewhat over half of its axial length being of spherical shape of a diameter that the casing may conveniently be held in the palm of the user's hand with the fingers extending beyond the spherical portion of the casing whereby pressure by the palm of the user at the end of the spherical portion in the direction of the axis of the casing holds the shaver in contact with the area to be shaved.

18. In a dry shaver, a pair of nested cooperating cutter members having circular cutting edges and cylindrical contacting portions to cause the axis of the inner cutter to revolve in a small circle around the axis of the outer cutter, the ratio of the diameters of the inner and outer cutting edges being the inverse of, but closer to unity than the ratio of the pitch diameters of the inner and outer cylindrical contacting portions of the cutter members.

19. A cutter for a dry shaver comprising a thin steel band having a cylindrical shape centrally, an outwardly directed integral flange for securing the cutter in the shaver, and an inwardly directed flange beveled at the outer side of its free inner margin to provide a cutting edge.

20. In a dry shaver, a high-speed rotatable spindle, a cutter, and means rotating with the spindle to resiliently exert a radial and an axial pressure on the cutter.

21. In a dry shaver, a circular cutting edge, a revolving cutter having a cutting edge cooperating therewith, resilient means exerting a rotating radial pressure on the cutter, and resilient means exerting an axial pressure on the cutter to hold the cutting edges in contact as the cutter revolves.

22. In a dry shaver, a stationary blade having a circular cutting edge, a cutter symmetrical in all planes through its axis and having a circular cutting edge engaging the edge of the blade, and rotating mechanism including means exerting a resilient radial and outward pressure on the cutter to hold its edge constantly in contact with the edge of the blade while the cutter revolves.

23. A cutter for a dry shaver comprising a body having an outer cylindrical bearing surface, an inner cylindrical bearing surface and a circular cutting edge to one side of both of said surfaces, said outer surface being toothed across its axial length and the inner surface being smooth.

JESSE ATWATER JACKSON.